United States Patent
Frank

(10) Patent No.: US 9,465,598 B2
(45) Date of Patent: Oct. 11, 2016

(54) DEPLOYMENT OF BRANDED SOFTWARE

(71) Applicant: Barracuda Networks, Inc., San Jose, CA (US)

(72) Inventor: Steve Frank, Maynard, MA (US)

(73) Assignee: BARRACUDA NETWORKS, INC., Campbell, CA (US)

( * ) Notice: Subject to any disclaimer, the term of this patent is extended or adjusted under 35 U.S.C. 154(b) by 0 days.

(21) Appl. No.: 13/920,682

(22) Filed: Jun. 18, 2013

(65) Prior Publication Data

US 2013/0339944 A1 Dec. 19, 2013

Related U.S. Application Data

(60) Provisional application No. 61/661,539, filed on Jun. 19, 2012.

(51) Int. Cl.
*G06F 9/445* (2006.01)

(52) U.S. Cl.
CPC .. *G06F 8/61* (2013.01); *G06F 8/63* (2013.01)

(58) Field of Classification Search
CPC ........ G06F 3/04817; G06F 8/61; G06F 8/63; G06F 9/44505
See application file for complete search history.

(56) References Cited

U.S. PATENT DOCUMENTS

| | | | | |
|---|---|---|---|---|
| 6,367,073 B2* | 4/2002 | Elledge | ...................... | G06F 8/61 715/810 |
| 7,802,246 B1* | 9/2010 | Kennedy | ................... | G06F 8/61 717/173 |
| 2001/0039655 A1* | 11/2001 | Elledge | ........................... | 717/11 |
| 2002/0157091 A1* | 10/2002 | DeMello | ................ | G06Q 30/06 717/178 |
| 2004/0194082 A1* | 9/2004 | Purkeypile | ................ | G06F 8/71 717/174 |
| 2005/0005137 A1* | 1/2005 | Benedikt | ........................ | 713/189 |
| 2005/0138616 A1* | 6/2005 | Tyhurst | ................. | G06F 9/4415 717/174 |
| 2005/0144518 A1* | 6/2005 | Ricart et al. | ..................... | 714/13 |
| 2005/0172284 A1* | 8/2005 | Dandekar | ................. | G06F 8/61 717/175 |
| 2009/0328028 A1* | 12/2009 | O'Rourke | ................. | G06F 8/65 717/173 |

(Continued)

OTHER PUBLICATIONS

David Barrera et al; Understanding and Improving App Installation Security Mechanisms through Empirical Analysis of Android; 2012 ACM; pp. 81-92; <http://dl.acm.org/citation.cfm?id=2381949&CFID=632369888&CFTOKEN=33721283>.*

(Continued)

*Primary Examiner* — Thuy Dao
*Assistant Examiner* — Cuong V Luu
(74) *Attorney, Agent, or Firm* — Duane Morris LLP; David T. Xue

(57) ABSTRACT

A system for branding and deploying backup software includes a branding interface, a branding database, and an installer-generating server. The branding interface receives branding data from a partner associated with a partner machine. The branding database stores the received branding data. The installer-generating server generates a generic full installer capable of installing a software program and generates a branded installation shell in response to a request from the partner and using the stored branding data. The branded installation shell, when executed by the partner machine, retrieves the generic full installer from the installer-generating server. The branded installation shell causes the generic full installer to install in a branded location on the partner machine to make it appear as if the partner generated the software program installed by the generic full installer. Related apparatus, systems, techniques, and articles are also described.

9 Claims, 6 Drawing Sheets

(56) References Cited

U.S. PATENT DOCUMENTS

2011/0016462 A1* 1/2011 Tyhurst ........................ 717/171
2011/0296403 A1* 12/2011 Janzen ................ G06F 9/45537
                                                         717/176

OTHER PUBLICATIONS

Dan R. Herrick et al.; Sustainable Automated Software Deployment Practices; 2013 ACM; pp. 189-196; <http://dl.acm.org/citation.cfm?id=2504802&CFID=632369888&CFTOKEN=33721283>.*

Andreas P. Heiner et al.; Secure Software Installation in a Mobile Environment; 2007 Nokia; pp. 155-156; <http://dl.acm.org/citation.cfm?id=1280705&CFID=632369888&CFTOKEN=33721283>.*

M. Aasbakken et al.; Evaluation of User Engagement and Message Comprehension in a Pervasive Software Installation; 2012 IEEE; pp. 27-30; <http://dl.acm.org/citation.cfm?id=2663706&CFID=632369888&CFTOKEN=33721283>.*

John B. Tyndall ; Building an Effective Software Deployment Process; 2012 ACM; pp. 109-114; <http://dl.acm.org/citation.cfm?id=2382482&CFID=632369888&CFTOKEN=33721283>.*

D. V. McCarthy; ADP Installation Management Abstracts; 1970 SIGCOSM; 2 pages; <http://dl.acm.org/citation.cfm?id=1147442&CFID=632369888&CFTOKEN=33721283>.*

* cited by examiner

DEPLOYMENT OF BRANDED SOFTWARE

RELATED APPLICATIONS

This application claims priority to U.S. Provisional Patent Application No. 61/661,539, filed Jun. 19, 2012, the entire contents of which is incorporated herein by reference.

TECHNICAL FIELD

The subject matter described herein relates to simplification of remote deployment of branded software.

BACKGROUND

Software deployment is all of the activities that make a software system available for use. The general deployment process consists of several interrelated activities with possible transitions between them. These activities can occur at the producer site or at the consumer site or both.

Brand-able software is typically software created by one company for the purpose of allowing other companies to obtain, resell rights, or giveaway rights to the software, change the brand associated with it, and sell it as if it were their own. It may also be referred to as private label software or Rebranded Software. In many cases, the company providing the software allows many features of the software to be changed by the customer, such as the software name, graphics, installer and website links.

SUMMARY

In an aspect, a system for branding and deploying backup software includes a branding interface, a branding database, and an installer-generating server. The branding interface receives branding data from a partner associated with a partner machine. The branding database stores the received branding data. The installer-generating server generates a generic full installer capable of installing a software program and generates a branded installation shell in response to a request from the partner and using the stored branding data. The branded installation shell, when executed by the partner machine, retrieves the generic full installer from the installer-generating server. The branded installation shell causes the generic full installer to install in a branded location on the partner machine to make it appear as if the partner generated the software program installed by the generic full installer.

One or more of the following features can be included. For example, branding data can include an image that includes one or more of a partner specified graphics, a name, and a website link. The branding interface can include a web-based application. The generic full installer can include a loosely relational database structured as a component object model structured storage file. A partner can be a managed services provider (MSP) that manages and assumes responsibility for providing data backup services to the partner machines. A partner can be a value-added reseller (VAR) that adds data backup services to an existing product, and then resells it to end-users as an integrated data backup product.

The system can further include a token server. The branded installation shell can be associated with a token, and the token can be disabled once the generic full installer has completed installation on the partner machine. The stored branding data can be a dynamic link library file.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. Large-scale software deployment can take several days to complete; the current subject matter can reduce that time to a few hours of mostly automated process. Installer file sizes can be reduced. A branding process can be automated and additionally, a user will be able to make branding changes and instantly see the result. Users will also get the ability to deploy the software from third party systems by creating installers that are compiled for specific computers. Installers can run in silent mode (e.g., no user interaction required). Third parties can deploy software automatically through their own interface. Alternately, credentials can be specified via a command line, simplifying the deployment. Dependencies on manual work can be reduced. Faster builds and deployments of installers and auto-updates are possible.

The current subject matter provides for a streamlined installation and setup process for users. Credentials and settings can be embedded in an installer or passed in via the command line. Additionally, deployment can guarantee that the latest software versions are installed.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter can provide for the automated creation and deployment of branded installation software.

Figure 1:
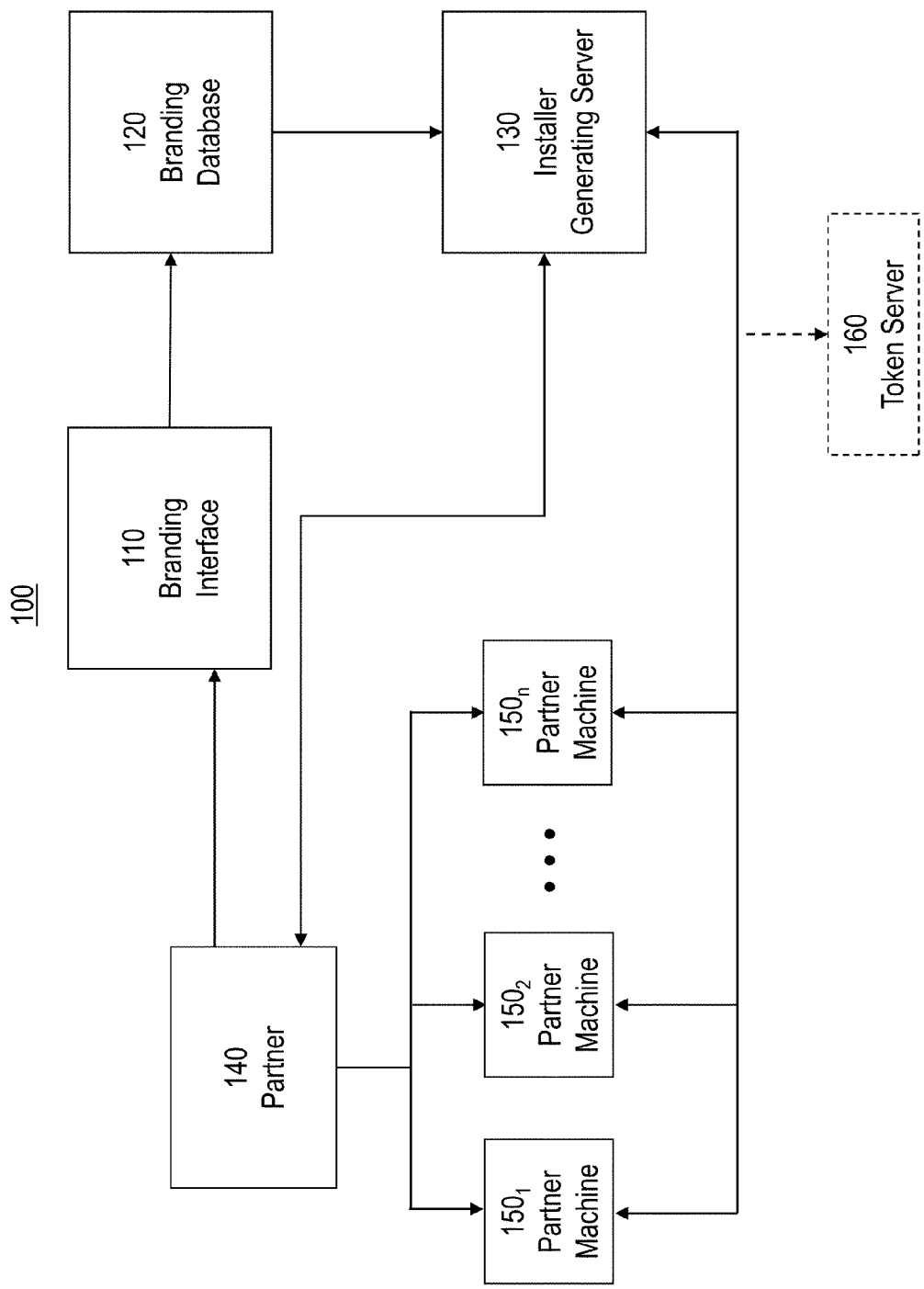
FIG. 1 is a system diagram of a system for branding and deploying backup software.

FIG. 1 is a system diagram 100 of a system for branding and deploying backup software. A branding interface 110, such as a webpage or other application receives branding data from a partner 140. Branding data can include an image with one or more partner 140 specified graphics, name, and website link. The branding data can include, for example, a logo associated with the partner 140. A partner 140 can be a managed services provider (MSP) that manages and assumes responsibility for providing services to clients of the partner. The services can include backup of data. The partner can be a value-added reseller (VAR) that adds services to an existing product, and then resells it to end-users as an integrated product.

The partner 140 has any number of partner machines 150$_j$ (j=1, 2, . . . , n) associated with the partner, as, for example, clients or customers of the partner 140. A partner machine 150$_j$ can include a personal computer, mobile device, server, or other computing system.

The system further includes a branding database 120 for storing the branding data received by the branding interface 110 from the partner 140. The stored branding data can be a dynamic link library file (e.g., file with .dll extension). An installer-generating server 130 can generate a branded installation shell in response to a request from the partner 140. The generation of the branded installation shell includes retrieving the stored branding data from the branding database 120. The installer-generating server 130 also generates a generic full installer. The generic full installer is an installation package that is not branded, that is, does not contain branding data, is not specific to a particular partner 140, and can be used across different partners 140. The generic full installer is an executable that includes all data and files (e.g., plugins, dependencies, etc.) necessary to install a software program. The software program can be a remote data backup program.

The branded installation shell has functionality for interacting with an end-user, but does not actually install the program. Instead, when executed, the branded installation shell retrieves the generic full installer from the installer-generating server and causes the generic full installer to install the software program. The branded installation shell provides any branding information to the generic installer that may be required during installation of the program to ensure that the program appears to originate from the partner 140, rather than the installer-generating server 130. For example, the branded installation shell can cause the generic installer to install the software program to a file path that derives from the partner's name. For example, the software can be installed to " . . . \program files\partner name\program name\".

The system can optionally include a token server 160. Each branded installation shell can be associated with a token contained on the token server 160. The branded installation shell can query the token server 160, and, if the token is invalid, will not proceed with installation. If the token is valid, installation proceeds and the token is disabled once the generic full installer has completed installation on the partner machine 150$_j$.

Figure 2:
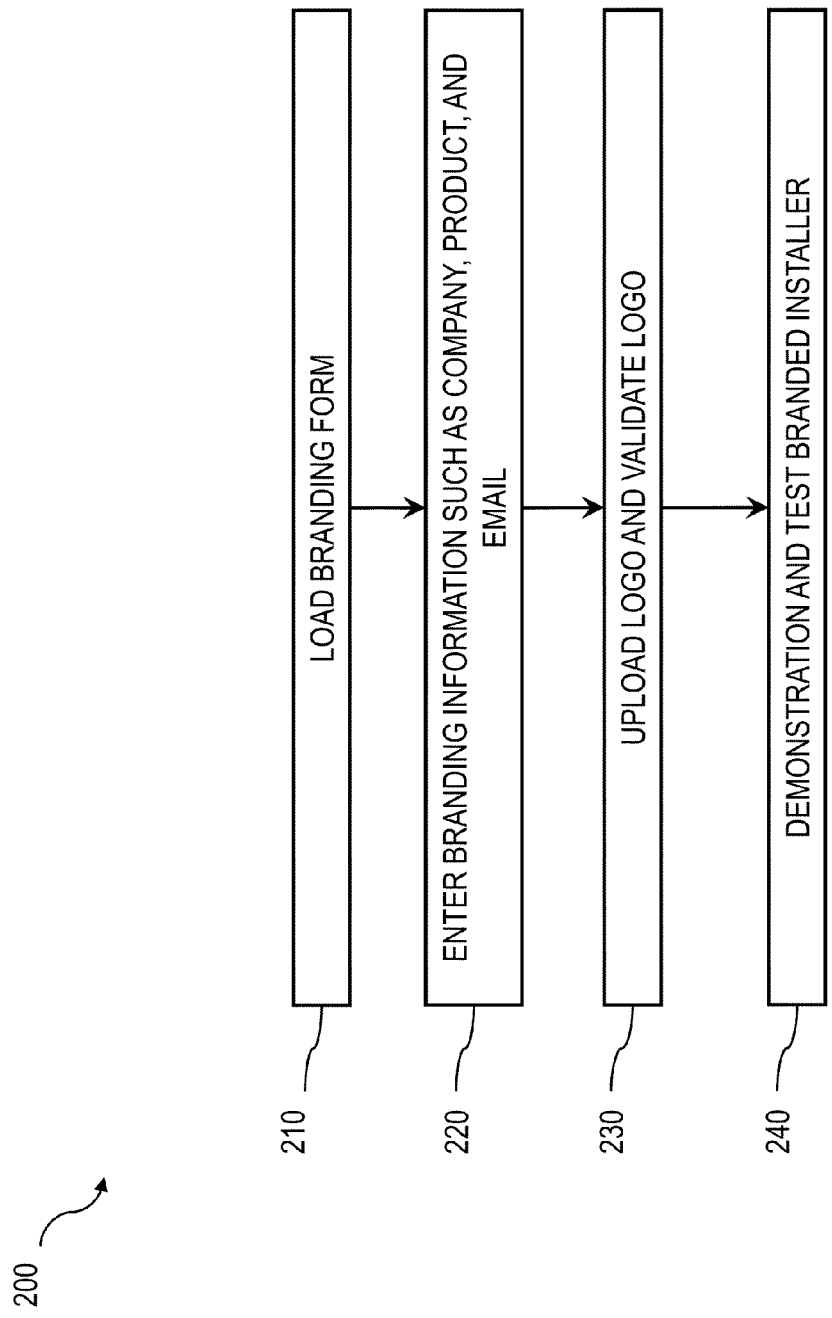
FIG. 2 is a process flow diagram illustrating a streamlined process of creating a branded installer.

FIG. 2 is a process flow diagram illustrating a streamlined process of creating a branded installer. A branding form is loaded at 210, then branding information, such as company name, product name and email is entered into to the form at 220. A logo can be uploaded and validated at 230. A demonstration of the installer can then be provided at 240.

In an example implementation, a branded shell installer can be created that is low in file size and is responsible for all user interaction, but does not actually install any data. Instead, the shell will remotely request (i.e. over a network) a second installer (i.e., generic full installer) to download and install all files and services in the background. The second installer can be brand independent (i.e., does not have to be configured specifically for each possible brand). The second installer can be a Microsoft windows installer (MSI). MSI is a software component used for the installation, maintenance, and removal of software on modern Microsoft Windows systems. The installation information, and often the files themselves, can be packaged in installation packages, loosely relational databases structured as COM Structured Storages and commonly known as "MSI files," from their default file extension. A benefit of the shell installer is that regardless of when the user received the shell installer, the shell installer will always install the latest version available of the software.

In an example implementation, branded shells can be generated just-in-time (JIT), that is, not until the user actually needs it. The information relating to the branding such as logos can be contained in a CoreData.dll file and embedded in the shell installer. Additionally, shell installers can be configured to guarantee that they are only run once. A token can be created each time a partner creates a branded shell installer on demand. The token is then registered into a database and the token can have an ID that is embedded in the installer. When the installer is run at a later time it can send the token ID to a web service which checks if the token ID exists in the database. If found, a full token is returned. If the installation is successful then the shell installer can send the token ID back to the web service to disable the token. If a user then subsequently runs the installer, a prompt can be provided by the installer to the user notifying the user that that installer is no longer valid.

The shell installers can be created by InnoSetup. InnoSetup is a script based installation building engine written in Delphi. The engine provides for a user to customize the installation. Once scripts have been written, debugged and compiled, a single execution file can be created.

The second installer can be run in silent mode where progress messages or windows are not displayed during installation. The second installer is configured to know what files to install, how to install them, and where they go. The second installer need not be branded. Instead, the shell can pass all branding information to the second installer when the second installer is run and allows the brand to be visible in the Add/Remove Programs panel.

Figure 3:
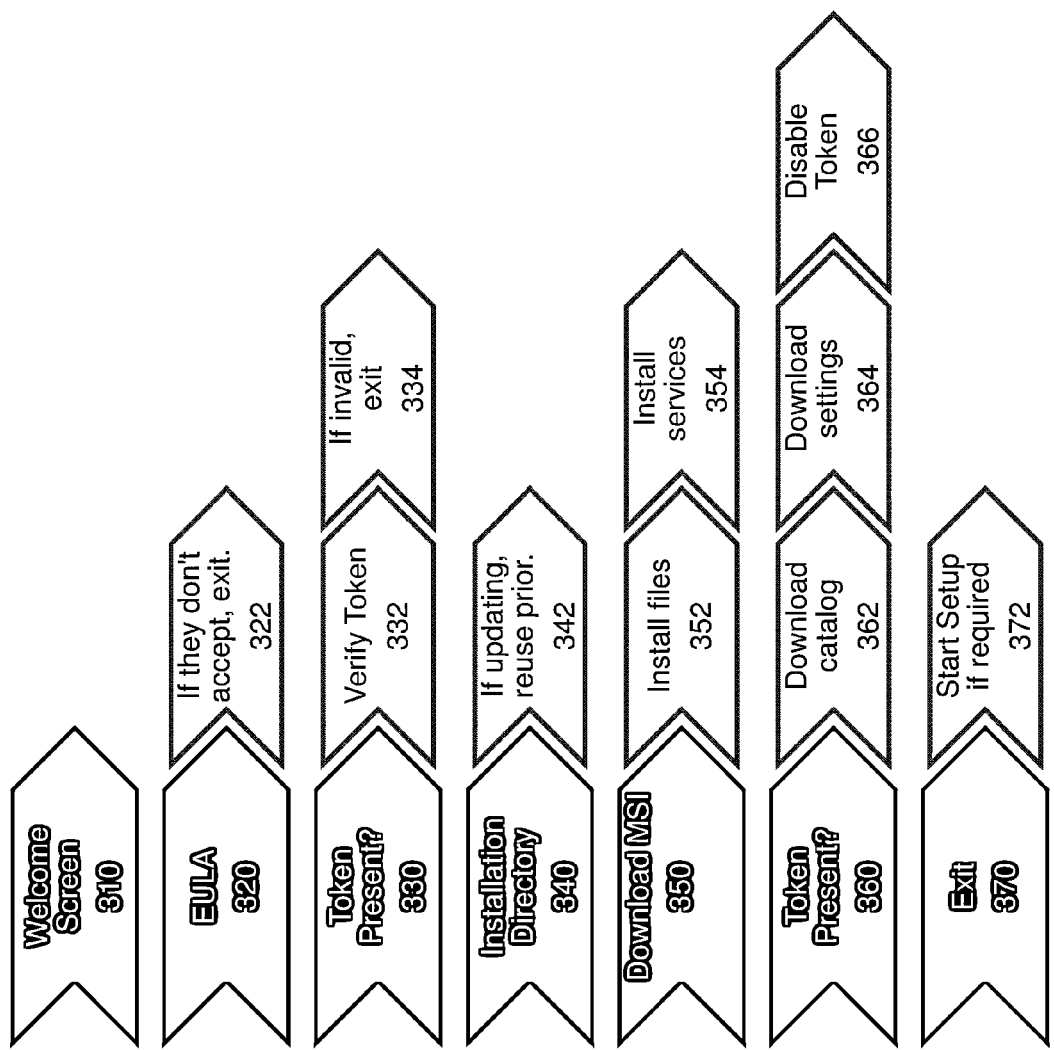
FIG. 3 is a process flow diagram representing a high-level view of the installation process.

FIG. 3 is a process flow diagram representing a high-level view of an example implementation installation process. Once a user has initiation an installation, at 310 a welcome screen and End User License Agreement (EULA) at 320 is presented and prompts the user to accept. Once accepted, the installer will check for the presence of and verify the validity of a token at 330 and 332. The second installer can be downloaded, then the files and services installed. If the token is present at 360 a catalog and settings are downloaded and the token is disabled at 362, 364, and 366. Setup may be started if required at 372. The catalog is a database stored on the customer's computer used by the backup agent to track what has been backed up.

Figure 4:
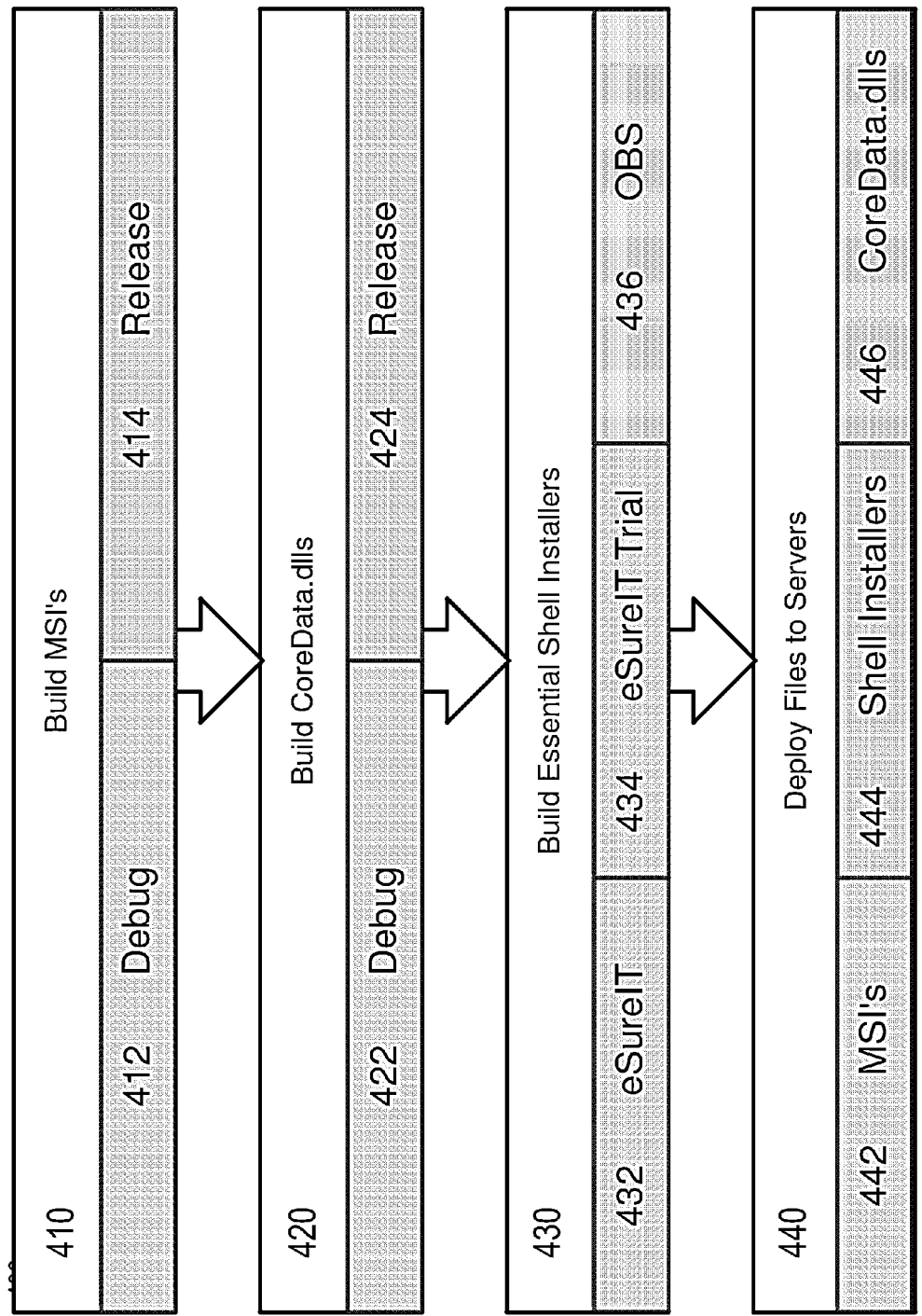
FIG. 4 is a process flow diagram illustrating a build and deployment process.

FIG. 4 is a process flow diagram 400 illustrating an example implementation build and deployment process. At 410, two MSIs are built for both debug 412, and release 414. Steps 412 and 414 can be completed concurrently. At 420, CoreData.dlls debug 422 and release 424 can be built for each brand. At 430, shell installers can be built for each software product (e.g., eSureIT at 432, eSureIT Trial at 434, and OBS at 436). Once all MSI's, shell installers, and CoreData.dll's are generated, they can be deployed to servers for use by users. At 440, the built files are deployed to servers by copying at 443 the MSI's, at 444 the shell installers, and at 446 the CoreData.dlls to the servers.

Figure 6:
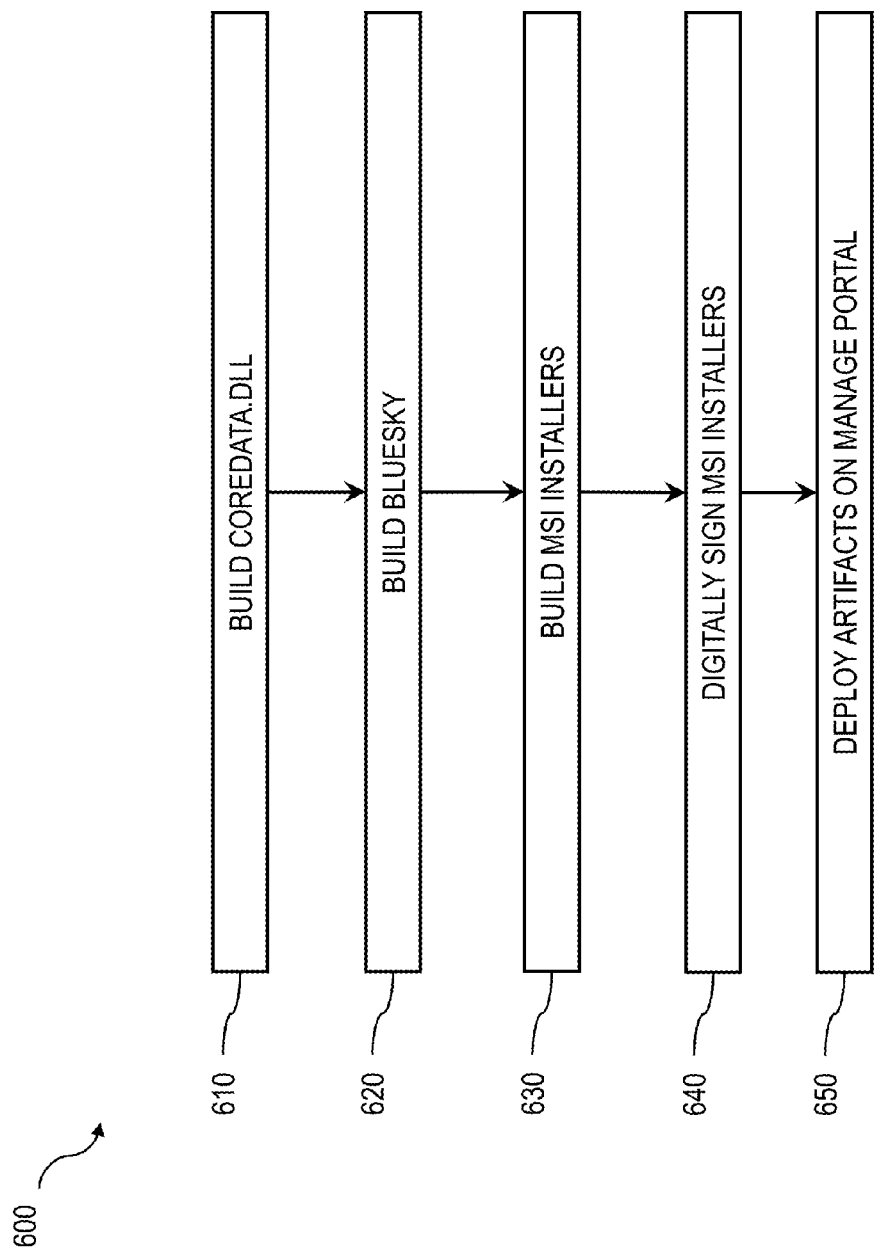
FIG. 6 is a process flow diagram illustrating a detailed process of installation.

FIG. 6 is a process flow diagram 600 illustrating an example implementation build and deployment process. At 610, for each manufacturer in eSureIT, OBS, and brandeds, CoreData.dll's are built (i.e. binaries are created) and copied to a CoreData folder in a directory in which binaries are deployed after building on a build server. At 620, Bluesky is built (i.e. binaries are created) for both debug and release. The debug binaries are copied to a debug folder in the deployment directory and the release binaries are copied to a release folder in the deployment directory. At 630, MSI installers are built for both debug and release and copied to their respective debug and release folder in the deployment directory. Each folder contains a BackupSoftware.cab and a ManagePlugin.cab. At 640, each MSI installer is digitally signed. At 650, artifacts are deployed by copying all CoreData.dll files and all MSI installers to a Manage Portal.

Figure 5:
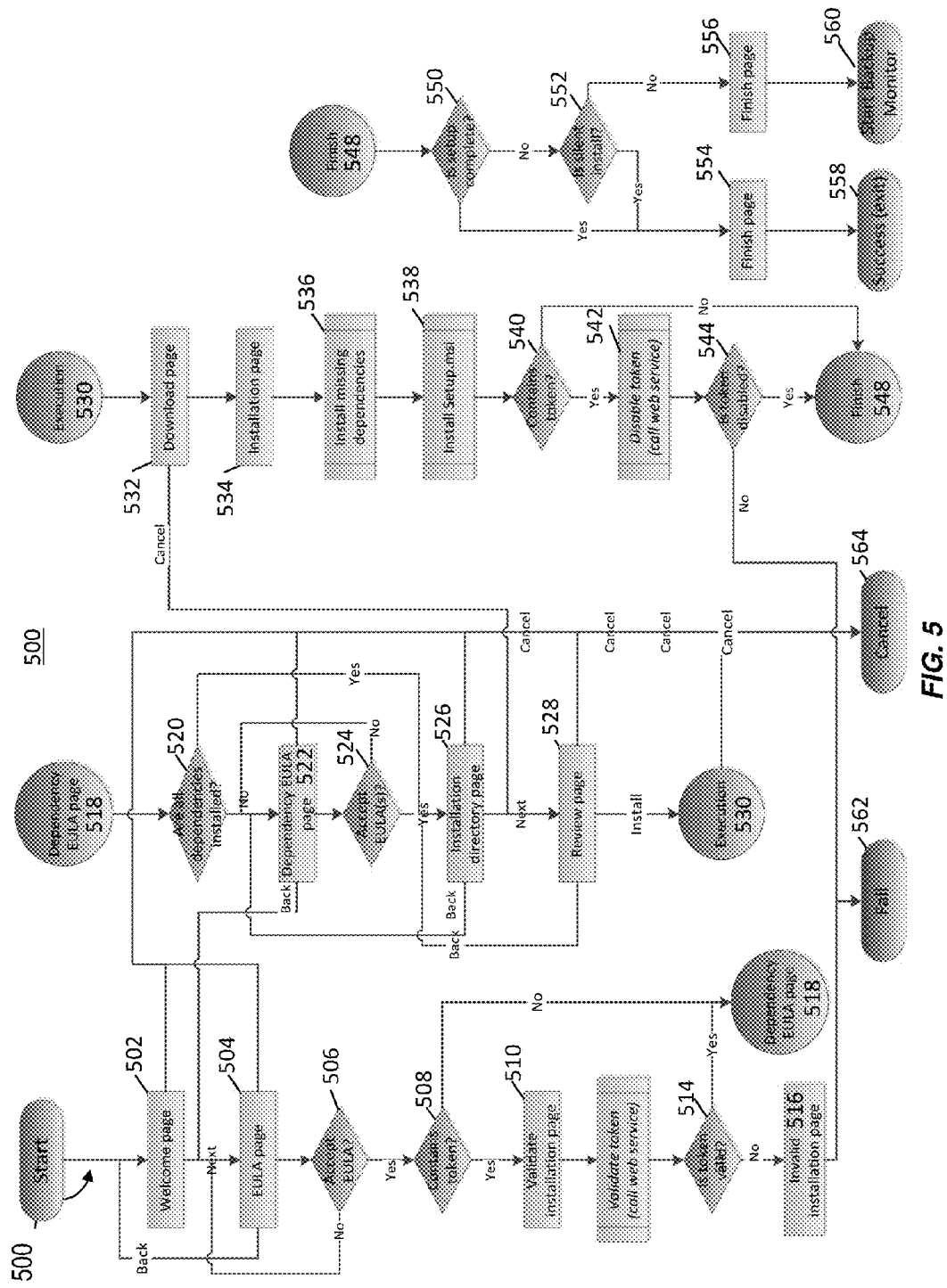
FIG. 5 is a process flow diagram illustrating a detailed build and deployment process.

FIG. 5 is a process flow diagram 500 illustrating a detailed method of installation in an example implementation. At 502, a user can be presented with a welcome back. The user can select cancel 564 or next. At EULA page 504, the user can select back, cancel, or accept. At 506, a determination can be made whether or not the user accepted. If the user accepted, at 508, a determination can be made regarding if a token is present in the installer. If not, the process can proceed to Dependency EULA 518. If there is a token, a validate installation page can be presented 510. At 512, the token can be validated. At 514, a determination is made as to if the token is valid. If the token is not valid, at 516, an invalid installation page can be provided to the user and the installation can fail 562. If the token is valid, the process can proceed to the Dependency EULA 518.

At 520, a determination can be made if all required dependencies have been previously installed on the system. If they have, then the process proceeds to provide a review page at 528. If all the required dependencies have not been previously installed on the system, then EULA's are provided for the dependent software and the user can accept at 524. At 526, a page prompting the user to select an installation director can be presented and once selected, the process proceeds to the review page 528. The user may select cancel 564 to terminate the installation process, or the user may select install to proceed to execution 530.

At 532, a download page can be provided to the user specifying and missing dependencies, the setup.msi, cabinets (such as BackupSoftware.cab and ManagePlugin.cab), and token components (such as catalog, and settings.xml). At 534, an installation page can be provided to the user. At 536, the missing dependencies can be installed. At 538, setup.msi can be installed. At 540, a determination can be made regarding the existence of one or more tokens. If no tokens exist, the process can proceed to finish 548. If tokens do exists, then at 542, disable the tokens and at 544, check that the tokens have been disabled. Then, the process can proceed to finish 548. At 550, a determination is made regarding whether setup is complete. If not, at 552, determine if the installation is a silent installation. If it is a silent installation, continue to finish page 554 and exit with success 558. If the installation is not a silent install, then proceed to finish page 556 and start backup monitor 560.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A system for branding and deploying backup software, the system comprising:
    a branding interface stored in a first memory for receiving branding data from a partner associated with a partner machine;
    a branding database having a second memory for storing the received branding data; an installer-generating server having a third memory for storing executable instructions for:

generating a generic full installer capable of installing a software program without branding data, wherein the software program is stored in a manage portal; and generating a brand installation shell in response to a request from the partner and using the stored branding data;

wherein the branded installation shell, when executed by the partner machine, retrieves the generic, full installer from the installer-generating server, provides branding data to the generic, full installer;

downloads the software program to a branded location on the partner machine from the manage portal, the branded location is specific to the partner machine; and causes the generic, full installer to install the software program and the provided branding data in the specific branded location on the partner machine to make it appear as if the partner machine generated the software program installed by the generic, full installer rather than by the manage portal.

2. The system of claim 1, wherein branding data includes an image comprising one or more of partner-specified graphics, a name, and a website link.

3. The system of claim 1, wherein the branding interface includes a web-based application.

4. The system of claim 1, wherein the generic, full installer includes a loosely relational database structured as a component object model-structured storage file.

5. The system of claim 1, wherein the partner is a managed services provider (MSP) that manages and assumes responsibility for providing data backup services to the partner machines.

6. The system of claim 1, wherein the partner is a value-added reseller (VAR) that adds data backup services to an existing product, then resells it to end-users as an integrated data backup product.

7. The system of claim 1, further comprising a token server, wherein the branded installation shell is associated with a token, and the token is disabled once the generic full installer has completed installation on the partner machine.

8. The system of claim 1, wherein the stored branding data is a dynamic link library file.

9. An article of manufacture having computer-readable program portions embedded in a memory thereon for branding and deploying backup software, the embedded portions comprising instructions for:

retrieving, by a branding interface stored in a first memory, branding data from a partner associated with a partner machine;

storing the received branding data in a second memory of a branding database;

generating, by an installer-generating server, a generic, full installer capable of installing a software program without branding data, wherein the software program is stored in a manage portal;

generating, by the installer-generating server, a branded installation shell including the stored branded data, in response to a request from the partner;

retrieving, by the branded installation shell when the shell is executed by the partner machine, the generic, full installer from the installer-generating server;

providing branding data from the branded installation shell to the generic, full installer;

downloading the software program to a branded location on the partner machine from the manage portal, the branded location is specific to the partner machine; and installing, by the generic full installer, the software program and the provided branding data in the specific branded location on the partner machine to make it appear as if the partner machine generated the software program by the generic, full installer rather than by the manage portal.

\* \* \* \* \*